(12) United States Patent
Nguyen et al.

(10) Patent No.: US 7,600,263 B1
(45) Date of Patent: Oct. 6, 2009

(54) ACCESS CONTROLLED SEARCH RESULTS

(75) Inventors: Phuong Binh Nguyen, Milpitas, CA (US); Eric D. Haugh, Mountain View, CA (US); Michael T. Moss, Los Angeles, CA (US)

(73) Assignee: Google Inc., Mountain View, CA (US)

( * ) Notice: Subject to any disclaimer, the term of this patent is extended or adjusted under 35 U.S.C. 154(b) by 636 days.

(21) Appl. No.: 10/982,407

(22) Filed: Nov. 5, 2004

(51) Int. Cl.
*G06F 7/04* (2006.01)
*H04L 9/00* (2006.01)
*H04L 9/32* (2006.01)

(52) U.S. Cl. .............. 726/27; 726/28; 726/29; 726/30; 713/168; 713/169; 713/170; 713/171; 713/172

(58) Field of Classification Search ........... 726/27
See application file for complete search history.

(56) References Cited

U.S. PATENT DOCUMENTS

| 6,092,196 A * | 7/2000 | Reiche ............... 726/6 |
| 6,336,117 B1 * | 1/2002 | Massarani ............ 707/100 |
| 2003/0120680 A1 * | 6/2003 | Agrawal et al. ....... 707/103 R |

\* cited by examiner

*Primary Examiner*—Longbit Chai (57) ABSTRACT

Serving a search result that includes an access controlled document includes obtaining a persistent access token that permits the verification of access to an access controlled document. The access controlled document is found in an index that includes an access controlled document and the persistent access token is used to verify authorization to access the access controlled document.

42 Claims, 6 Drawing Sheets

ACCESS CONTROLLED SEARCH RESULTS

FIELD OF THE INVENTION

The present invention relates generally to a search appliance. More specifically, a method for limiting access to search results is disclosed.

BACKGROUND OF THE INVENTION

Documents and other information stored on intranets can be indexed and made searchable in a manner similar to information contained on the Internet. With the help of a search appliance, users can perform queries on information made available on intranets and gain access to relevant documents or other information. In addition to publicly accessible documents, intranets can also contain information to which an administrator may wish to limit access to specific users or groups of users. To protect the secrecy of such information, there is a need to prevent unauthorized users from gaining information about and access to search results that contain information that unauthorized users should not access.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
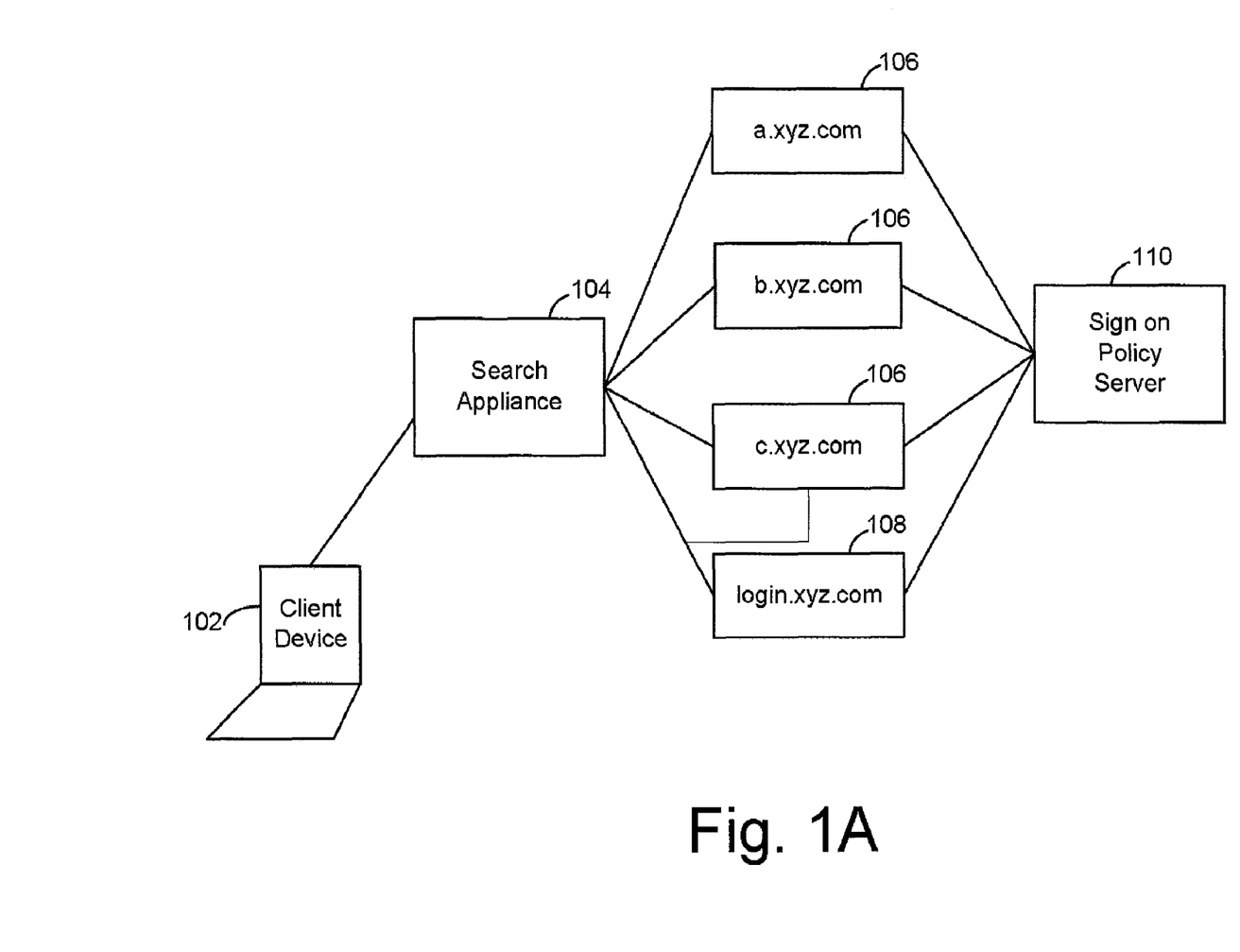
FIG. 1A is a block diagram illustrating a content delivery system with access control and search capability according to some embodiments.

FIG. 1A is a block diagram illustrating a content delivery system with access control and search capability. The system includes a client device 102, a search appliance 104, one or more content servers 106, a login server 108, and a sign on policy server 110.

Search appliance 104 indexes content on one or more content servers 106. Queries are submitted through client device 102 to search appliance 104, which returns results to client device 102 based on its indexing. Content servers 106 may contain access controlled documents. Access controlled documents are documents to which some type of access control has been provided, including Web pages, text files, multimedia files, object features, link structure, and other content. Public documents refer to documents that are generally not access controlled. One way of providing access control is to use credentials.

To prevent users from viewing search results that contain access controlled documents that they are not authorized to view, credentials may be required from the user before displaying search results on client device 102. Sign on policy server 110 facilitates credential checking by providing content servers 106 with policies specifying which users or groups of users may access certain access controlled documents. A persistent access token, such as a cookie, can be used to prevent the client device 102 from needing to supply credentials for each document searched. Other technology that provides persistency that enables the user to provide credentials on a less than per document basis may be implemented, such as a sign on procedure.

To obtain a client cookie, client device 102 provides credentials to login server 108. As discussed more fully below, search appliance 104 in some cases acts as an intermediary between client device 102 and login server 108. Login server 108 verifies the supplied credentials with sign on policy server 110 and if the credentials are valid, issues a client cookie to client device 102. In some embodiments, the functionality of login server 108 is provided by sign on policy server 110 and login server 108 is omitted.

Figure 1B:
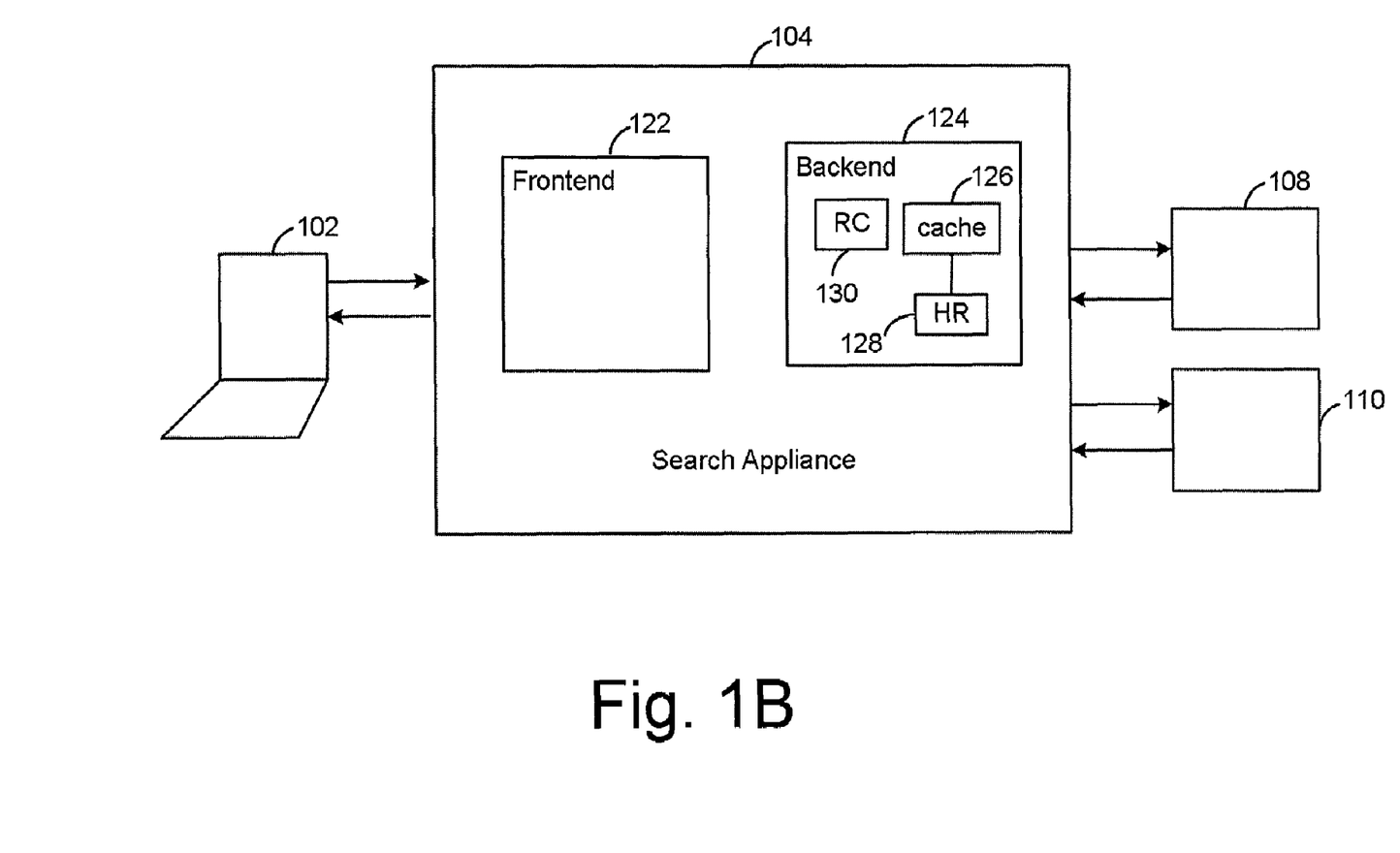
FIG. 1B is a diagram illustrating an embodiment of a search appliance.

FIG. 1B is a diagram illustrating an embodiment of a search appliance. A search query is submitted through frontend 122 of search appliance 104 via client device 102. Frontend 122 interfaces with backend 124. Backend 124 includes an authorization cache 126 and HEAD requester 128. As explained more fully below, authorization cache 126 and HEAD requester 128 are used by search appliance 104 to determine whether a user is authorized to view results including access controlled documents. In some embodiments, backend 124 also includes a ranking component 130 which scores indexed documents based on relevance.

Figure 2:
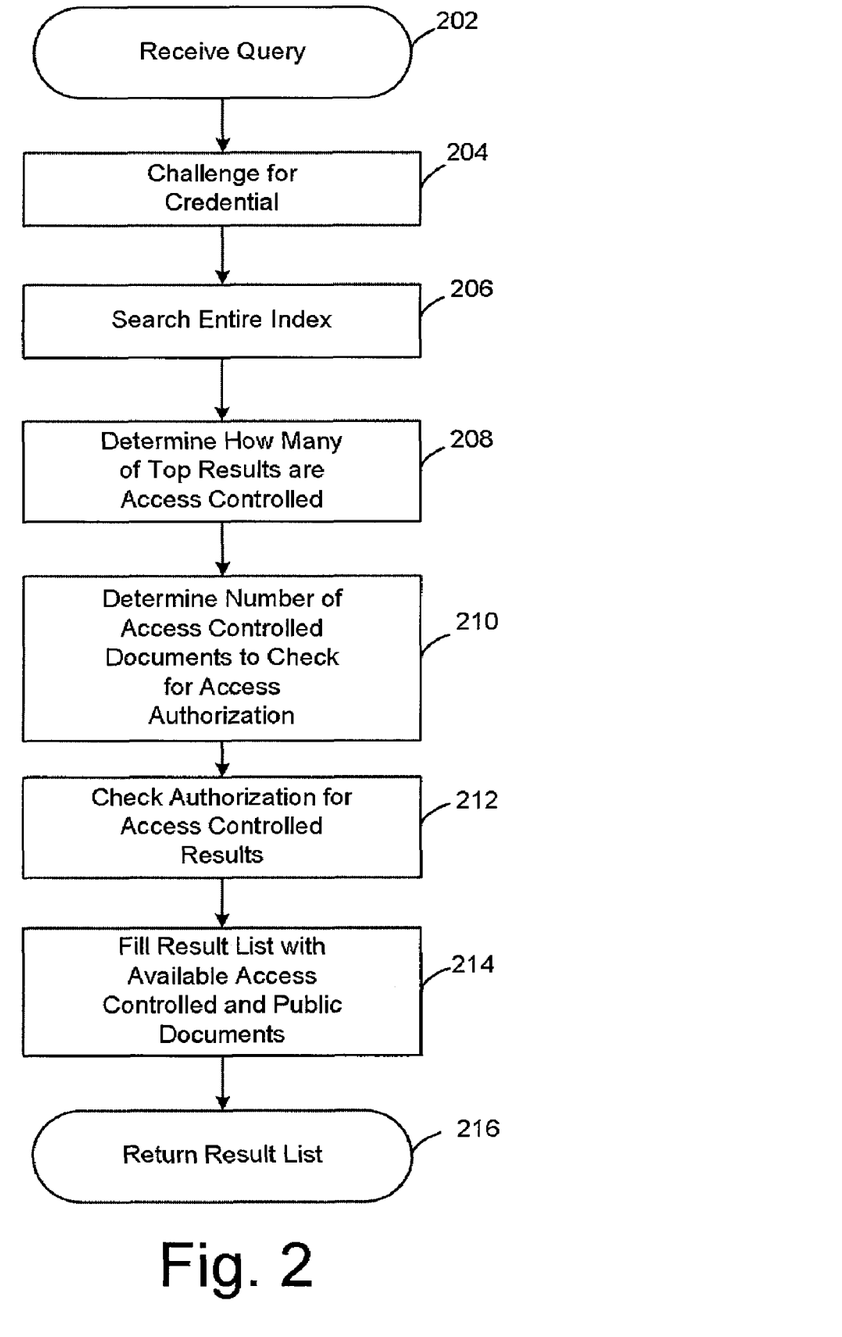
FIG. 2 is a flow chart illustrating a method for delivering content with access control and search capabilities according to some embodiments.

FIG. 2 is a flow chart illustrating a method for delivering content with access control and search capabilities. A query is received by a search appliance from a client device at 202. At 204, the client device is issued a challenge for a credential. It may be more secure to challenge for credentials regardless of the existence of a secure result, rather than challenging after a search is run and a secure result is found. By always challenging for credentials, an unauthorized user is less likely to gain information about the existence of access controlled documents to which the user does not have access. For example, if after querying "FDA approval" a credential challenge is issued, but after querying "FDA rejection" a result list of zero documents is returned, a user has—without providing valid credentials—learned that there is at least one access controlled document on one content server related to FDA approval, but there are no documents on any content servers related to FDA rejection.

In some cases the query received at 202 may be accompanied by a persistent access token. Rather than challenging for a credential at 204, the validity of the supplied persistent access token may be checked as appropriate, such as by checking whether the persistent access token is expired. As described more fully in conjunction with FIGS. 4-5, if a persistent access token is not received at 202, one may be issued after valid credentials are supplied at 204.

At 206, the search appliance searches its index for documents related to the query, including both public and access-controlled documents, irrespective of whether the user is entitled to view them. Search results are typically returned to the client device in batches, such as 20 results per page, and can include both public and access controlled documents.

It is computationally expensive to fetch all documents relevant to a query and determine the subset of documents to which a user is entitled access. Resources can be saved and performance can be enhanced by ranking all results, but subjecting only a subset of those results to an authorization check. At 208, the search appliance determines how many of the top 20 results are access controlled documents. For example, the 20 highest ranked documents may include 15 public documents and 5 access controlled documents. At 210, the search appliance determines how many access controlled documents to check credentials against to likely yield a full batch of viewable results. For example, the search appliance may determine that access to the 10 highest ranked access controlled documents should be checked to likely yield enough documents to fill a result list of 20 documents.

At 212, the search appliance checks the user's authorization to access the access controlled documents. In some cases, the user may not have authorization to view enough of the highest ranked access controlled documents to return a full result list immediately. For example, of the top 25 documents, the user may only be authorized to access 17 documents. In that case, the search appliance, returning to 210, continues to evaluate lower ranked documents until a full list can be returned, for example, by adding lower ranked public documents to the result list and evaluating batches of lower ranked access controlled documents as necessary. At 214, a result list is constructed, comprising the top ranked results to which the user is authorized access. In some cases, an insufficient number of documents to which a user has access may exist to fill a result list. For example, a user may only be authorized to access a total of 13 documents out of hundreds of relevant documents. In other cases, less than 20 relevant documents may exist, irrespective of whether the user is authorized to access them. In either case, the completed result list will contain fewer than 20 documents. At 216, the result list is returned to the client device.

A user may optionally request at 202 that search results be limited to public documents only. In that case, no credential is required; the search appliance limits its search to the public documents in its index; and otherwise functions as a typical search appliance.

Figure 3:
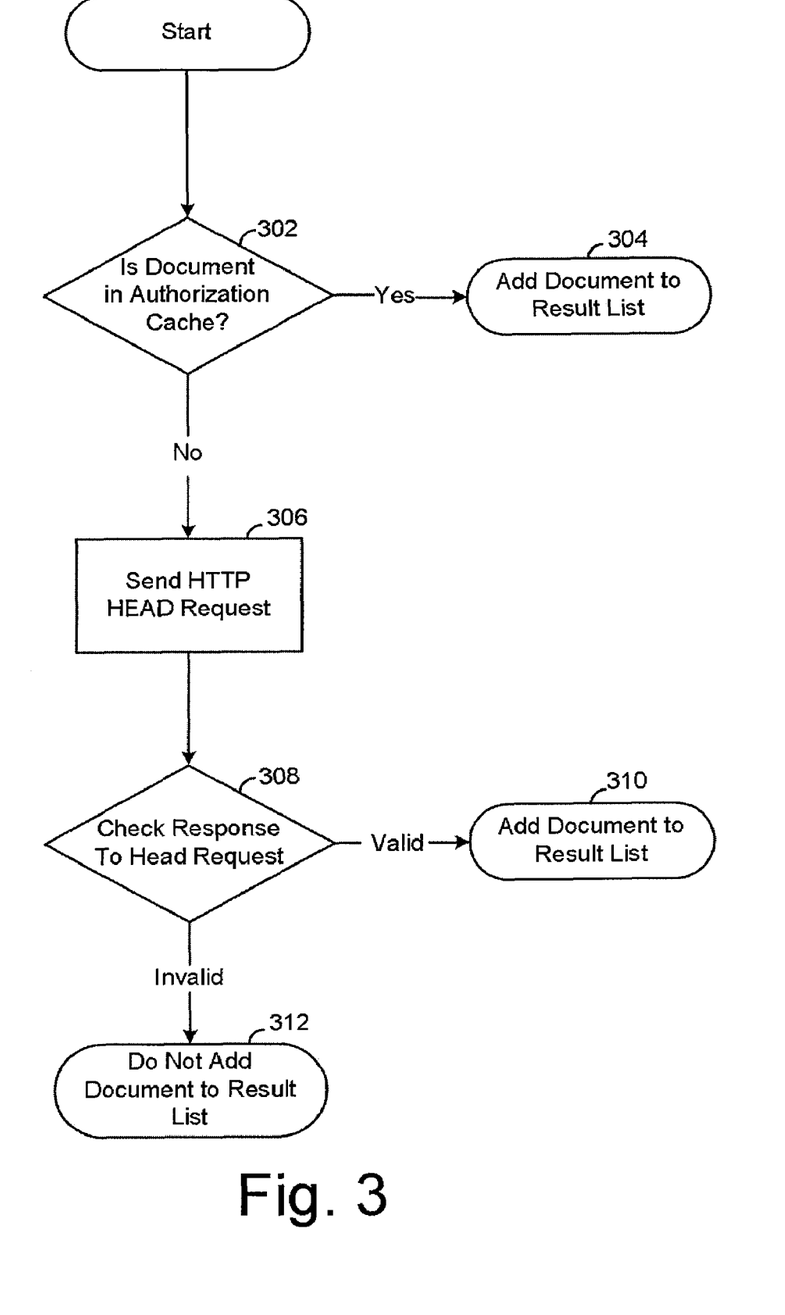
FIG. 3 is a flow chart illustrating a process used in some embodiments to determine whether a user is authorized to view a search result including an access controlled document.

FIG. 3 is a flow chart illustrating a process used in some embodiments to determine whether a user is authorized to view a search result including an access controlled document. The process depicted in FIG. 3 can be used to implement the authorization check of access controlled documents at 212 in FIG. 2. The process begins by determining at 302 whether the user's authorization to access the access controlled document is cached in authorization cache 126. If so, this indicates that the user is authorized to access the document and no re-verification is required. In this case, the document is added to the result list at 304 and the process ends. If the access control placed on a document changes during the time that a user's authorization to access the document is cached, security concerns can arise. The length of time that authorization is cached, and the ability of an administrator to purge the cache on demand are selected as appropriate.

If the user's authorization to access the access controlled document is not cached, then at 306 HEAD requester 128 sends an HTTP HEAD request for the access controlled document to the content server 106 upon which the access controlled document resides. At 308 the response to the HTTP HEAD request is checked. If the response to the HTTP HEAD request indicates that the HTTP HEAD request is valid, the user is authorized to access the access controlled document, and the access controlled document is added to the result list at 310. If the HTTP HEAD request is not valid, the user is not authorized to access the access controlled document and the document is not added to the result list.

It is possible for an administrator to configure content server 106 to reject HTTP HEAD requests. In that case, HEAD requester 128 can be modified to send and evaluate an HTTP GET request with a range header of 0. It is possible for an administrator to configure content server 106 to ignore range headers. In that case, content server 106 may respond to requests sent by HEAD requestor 128 with the full access controlled document if the user is authorized to access it. The document may then be discarded.

Figure 4:
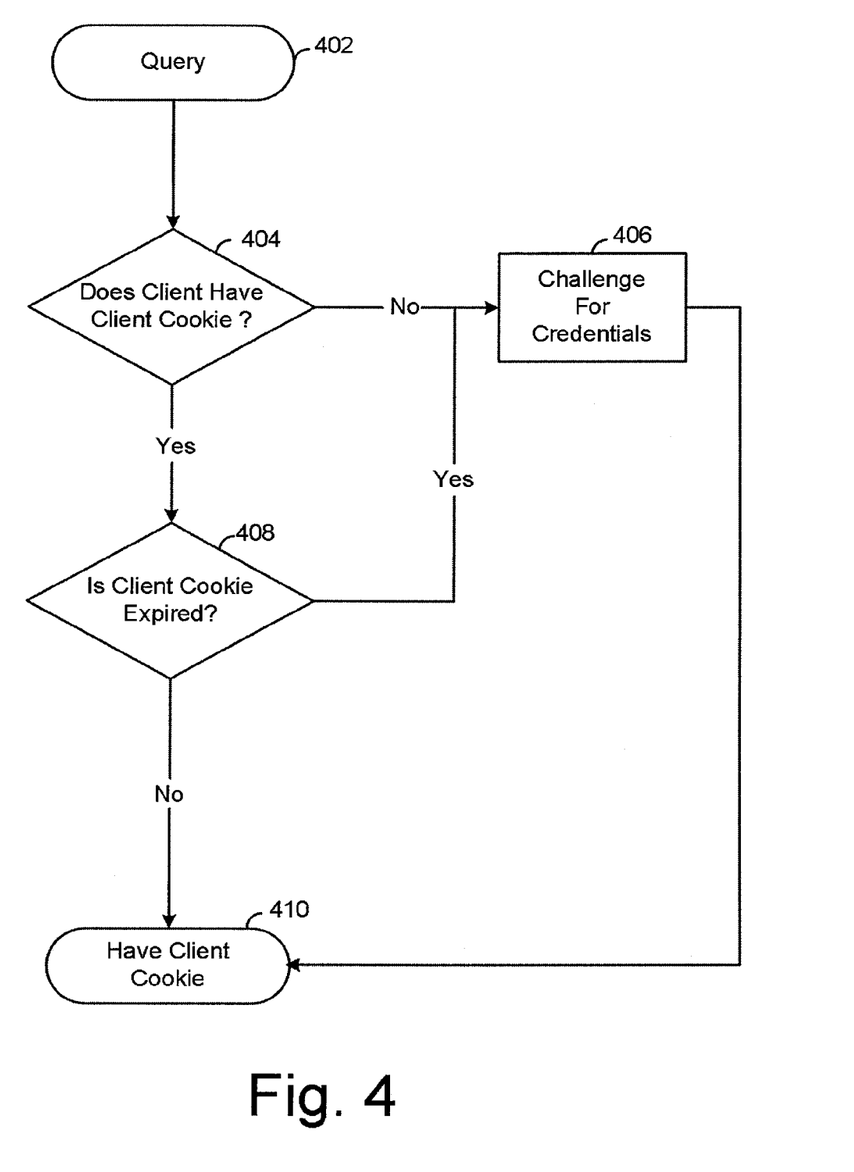
FIG. 4 is a flow chart illustrating a process used in some embodiments to obtain a valid client cookie from a client device.

FIG. 4 is a flow chart illustrating a process used in some embodiments to obtain a valid client cookie from a client device. At 402, a query is received by search appliance 104 from client device 102. At 404 it is determined whether the query was submitted with a client cookie. If no client cookie was provided, the user is challenged for credentials at 406, such as by being required to submit a username and password to login server 108. If a client cookie was provided, search appliance 104 determines whether the client cookie is expired at 408. In one embodiment, expiration is tested through a cookie testing URL. The cookie testing URL is accessible to everyone with a valid client cookie. For example, HTTP status code 401 can indicate both expired (invalid) credentials, and valid, but insufficient credentials. The cookie testing URL allows the search appliance 104 to distinguish between these two errors. If the cookie is expired, the user is challenged for credentials at 406. If the user provides valid credentials at 406, the user is issued a client cookie. The process ends at 410 when the search appliance 104 has a query and a valid client cookie from client device 102, which can be forwarded to content server 106.

There are some circumstances under which search appliance 104 will either be unable to get a client cookie from a client, or to use a client cookie to check a user's authorization to access an access controlled document. For example, the client device 102 may not provide a client cookie to search appliance 104, even though the client device has a client cookie. This can occur if the client cookie is linked to too narrow a domain, such as a.xyz.com, or b.xyz.com, and search appliance 104 is outside the narrow domain, such as by being named search.xyz.com. Another example includes a situation where client device 102 provides a valid client cookie to search appliance 104, but content server 106 rejects the cookie as invalid because it was not provided to the content server 106 directly by client device 102. This situation can occur if the cookie is IP restricted. IP restriction is a security feature that can be enabled by an administrator.

A method for overcoming both of these circumstances includes having the search appliance 104 obtain a search appliance cookie using the user's credentials. The search appliance cookie is then used by the search appliance to check whether the user would be able to access documents using those same credentials. This is referred to as user impersonation. Preferably, the search appliance stores the search appliance cookie that is obtained so that it can be reused. In some embodiments, search appliance 104 stores the search appliance cookie by wrapping the search appliance cookie in a wrapping cookie that the search appliance sends to client device 102. In subsequent search queries, client device 102 can supply the wrapping cookie to search appliance 104 and search appliance 104 can unwrap and use the search appliance cookie stored inside the wrapping cookie. In some embodiments, an administrator can configure the search appliance to always use user impersonation. This may be appropriate where IP restriction is enabled.

Figure 5:
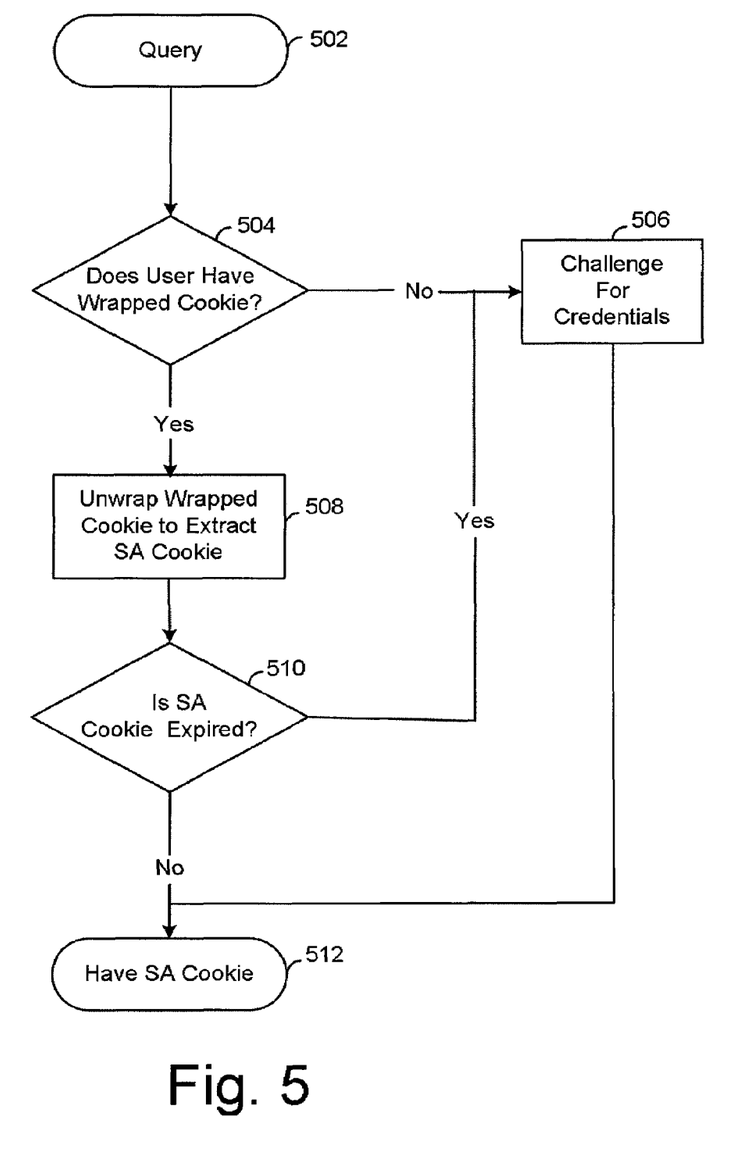
FIG. 5 is a flow chart illustrating a process to obtain a valid search appliance cookie.

FIG. 5 is a flow chart illustrating a process to obtain a valid search appliance cookie. This process may be used in conjunction with full user impersonation. At 502, a query is received by search appliance 104 from client device 102. At 504 it is determined whether the query was submitted with a wrapped cookie. If no wrapped cookie was provided, the search appliance 104 challenges the user for credentials at 506. The search appliance uses the supplied credentials to obtain a search appliance cookie, for example, by supplying the credentials to login server 108. If a wrapped cookie was provided, search appliance 104 unwraps the cookie to extract a search appliance cookie at 508. The search appliance 104 determines whether the search appliance cookie is expired at 510. If the search appliance cookie is expired, the user is challenged for credentials at 506. If the user provides valid credentials at 506, the search appliance uses the supplied credentials to obtain a search appliance cookie. The process ends at 512 when the search appliance 104 has a query from client device 102 and a valid search appliance cookie that can be forwarded to content server 106.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of serving a search result that includes an access controlled document comprising:
   receiving a query from a computing device;
   searching an index on one or more servers to obtain results to the query, wherein the index includes publicly accessible documents and access controlled documents;
   obtaining a persistent access token that permits the verification of access to one or more of the access controlled documents;
   ranking the results but subjecting only a subset of the results to an authorization check;
   using the persistent access token to verify authorization to access the subset of the access controlled documents from the ranked result, wherein an access controlled document is a document that is not publicly accessible; and
   continuing to evaluate lower ranked access controlled documents, if needed based on the authorization check, to return a result list to the computing device.

2. The method of claim 1 wherein the persistent access token is a cookie.

3. The method of claim 1 further comprising serving the result including one or more of the access controlled documents if it is determined that the persistent access token authorizes access to one or more of the access controlled documents.

4. The method of claim 1 wherein using the persistent access token to verify authorization to access the subset of the access controlled documents from the ranked results includes submitting an HTTP HEAD request.

5. The method of claim 1 wherein the persistent access token is issued by a single sign on server.

6. The method of claim 1 wherein using the persistent access token to verify authorization to access the subset of the access controlled documents from the ranked results includes submitting an HTTP GET request.

7. The method of claim 1 wherein using the persistent access token to verify authorization to access the subset of the access controlled documents from the ranked results includes submitting an HTTP GET request including range headers.

8. The method of claim 1 further comprising testing whether the persistent access token is expired.

9. The method of claim 1 further comprising checking whether authorization to access an access controlled document is cached in an authorization cache.

10. The method of claim 9 wherein the authorization cache is configured to enable an administrator to purge the authorization cache.

11. The method of claim 1 wherein the persistent access token is a cookie and the cookie is also used by a user to access an access controlled document included in the result list.

12. The method of claim 1 wherein the persistent access token is obtained from a user.

13. The method of claim 1 wherein the persistent access token is issued to a search appliance using a user's credentials.

14. The method of claim 1 wherein the persistent access token is issued to a search appliance using a user's credentials and stored with the user.

15. A system for serving a search result that includes an access controlled document comprising:
   an interface configured to receive a query from a computing device and to obtain a persistent access token that permits the verification of access to one or more access controlled documents; and
   a processor configured to search an index on one or more servers to obtain results to the query, wherein the index includes publicly accessible documents and access controlled documents, to rank the results but subject only a subset of the results to an authorization check, to use the persistent access token to verify authorization to access the subset of the access controlled documents from the ranked results, wherein an access controlled document is a document that is not publicly accessible, and to continue to evaluate lower ranked access controlled documents, if needed based on the authorization check, to return a result list to the computing device.

16. The system of claim 15 wherein the persistent access token is a cookie.

17. The system of claim 15 wherein the processor is further configured to serve the result list including one or more of the access controlled documents if it is determined that the persistent access token authorizes access to one or more of the access controlled documents.

18. The system of claim 15 wherein the processor is further configured to use the persistent access token to verify authorization to access the subset of the access controlled documents from the ranked results by submitting an HTTP HEAD request.

19. The system of claim 15 wherein the processor is further configured to communicate with a single sign on server.

20. The system of claim 15 wherein the processor is further configured to use the persistent access token to verify authorization to access the subset of the access controlled documents from the ranked results by submitting an HTTP GET request.

21. The system of claim 15 wherein the processor is further configured to use the persistent access token to verify authorization to access the subset of the access controlled documents from the ranked results by submitting an HTTP GET request including range headers.

22. The system of claim 15 wherein the processor is further configured to test whether the persistent access token is expired.

23. The system of claim 15 further comprising an authorization cache configured to cache authorization to access an access controlled document.

24. The system of claim 23 wherein the authorization cache is further configured to enable an administrator to purge the authorization cache.

25. The system of claim 15 wherein the persistent access token is a cookie and the cookie is also used by a user to access an access controlled document included in the result list.

26. The system of claim 15 wherein the persistent access token is obtained from a user.

27. The system of claim 15 wherein the processor is configured to obtain a persistent access token using a user's credentials.

28. The system of claim 15 wherein the processor is configured to obtain a persistent access token using a user's credentials and to store the obtained persistent access token with the user.

29. A computer program product for serving a search result that includes an access controlled document, the computer program product being embodied in a tangible computer readable storage medium and comprising computer instructions for:
   receiving a query from a computing device;
   searching an index on one or more servers to obtain results to the query, wherein the index includes publicly accessible documents and access controlled documents;
   obtaining a persistent access token that permits the verification of access to one or more of the access controlled documents;
   ranking the results but subjecting only a subset of the results to an authorization check;
   using the persistent access token to verify authorization to access the subset of the access controlled documents from the ranked results, wherein an access controlled document is a document that is not publicly accessible; and
   continuing to evaluate lower ranked access controlled documents, if needed based on the authorization check, to return a result list to the computing device.

30. The computer program product of claim 29 wherein the persistent access token is a cookie.

31. The computer program product of claim 29 further including instructions for serving the result list including one or more of the access controlled documents if it is determined that the persistent access token authorizes access to one or more of the access controlled documents.

32. The computer program product of claim 29 wherein using the persistent access token to verify authorization to access the subset of the access controlled documents from the ranked results includes submitting an HTTP HEAD request.

33. The computer program product of claim 29 wherein the persistent access token is issued by a single sign on server.

34. The computer program product of claim 29 wherein using the persistent access token to verify authorization to access the subset of the access controlled documents from the ranked results includes submitting an HTTP GET request.

35. The computer program product of claim 29 wherein using the persistent access token to verify authorization to access the subset of the access controlled documents from the ranked results includes submitting an HTTP GET request including range headers.

36. The computer program product of claim 29 further including instructions for testing whether the persistent access token is expired.

37. The computer program product of claim 29 further including instructions for checking whether authorization to access an access controlled document is cached in an authorization cache.

38. The computer program product of claim 37 wherein the authorization cache is configured to enable an administrator to purge the authorization cache.

39. The computer program product of claim 29 wherein the persistent access token is a cookie and the cookie is also used by a user to access an access controlled document included in the result list.

40. The computer program product of claim 29 wherein the persistent access token is obtained from a user.

41. The computer program product of claim 29 wherein the persistent access token is issued to a search appliance using a user's credentials.

42. The computer program product of claim 29 wherein the persistent access token is issued to a search appliance using a user's credentials and stored with the user.

* * * * *

UNITED STATES PATENT AND TRADEMARK OFFICE
CERTIFICATE OF CORRECTION

PATENT NO. : 7,600,263 B1
APPLICATION NO. : 10/982407
DATED : October 6, 2009
INVENTOR(S) : Nguyen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 966 days.

Signed and Sealed this

Fifth Day of October, 2010

David J. Kappos
*Director of the United States Patent and Trademark Office*